(12) United States Patent
Clarberg et al.

(10) Patent No.: US 9,142,008 B2
(45) Date of Patent: *Sep. 22, 2015

(54) HIERARCHICAL MOTION BLUR RASTERIZATION

(71) Applicant: Intel Corporation, Santa Clara, CA (US)

(72) Inventors: Franz P. Clarberg, Lund (SE); Carl J. Munkberg, Malmo (SE); Jon N. Hasselgren, Bunkeflostrand (SE); Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,149

(22) Filed: Sep. 10, 2014

(65) Prior Publication Data

US 2015/0022532 A1     Jan. 22, 2015

Related U.S. Application Data

(63) Continuation of application No. 13/033,741, filed on Feb. 24, 2011, now Pat. No. 8,854,377.

(51) Int. Cl.
*G06T 5/00*     (2006.01)
*G06T 13/80*    (2011.01)
*G06T 11/40*    (2006.01)

(52) U.S. Cl.
CPC ............... *G06T 5/002* (2013.01); *G06T 11/40* (2013.01); *G06T 13/80* (2013.01); *G06T 2207/20182* (2013.01)

(58) Field of Classification Search
None
See application file for complete search history.

(56) References Cited

U.S. PATENT DOCUMENTS

| 5,471,248 | A | 11/1995 | Bhargava et al. | |
|---|---|---|---|---|
| 5,852,443 | A | 12/1998 | Kenworthy | |
| 7,382,373 | B2 * | 6/2008 | Baxter et al. | 345/473 |
| 7,446,780 | B1 * | 11/2008 | Everitt et al. | 345/611 |
| 8,400,454 | B2 * | 3/2013 | Bleiweiss | 345/473 |
| 2006/0181534 | A1 * | 8/2006 | Meinds et al. | 345/473 |
| 2009/0179898 | A1 * | 7/2009 | Bond | 345/473 |

FOREIGN PATENT DOCUMENTS

| TW | 201042235 | 12/2010 |
|---|---|---|
| TW | 201105121 | 2/2011 |

OTHER PUBLICATIONS

Akenine-Moller. T., et al., Stochastic Rasterization using Time-Continuous Triangles, Department of Computer Science, Lund University, Sweden, Graphics Hardware 2007 (37 pages).

(Continued)

*Primary Examiner* — Said Broome
(74) *Attorney, Agent, or Firm* — Trop, Pruner & Hu, P.C.

(57) ABSTRACT

Motion blur rasterization may involve executing a first test for each plane of a tile frustum. The first test is a frustum plane versus moving bounding box overlap test where planes bounding a moving primitive are overlap tested against a screen tile frustum. According to a second test executed after the first test, for primitive edges against tile corners, the second test is a tile corner versus moving edge overlap test. The corners of the screen space tile are tested against a moving triangle edge in two-dimensional homogeneous space.

27 Claims, 8 Drawing Sheets

(56) References Cited

OTHER PUBLICATIONS

Gribel, C., et al., "Analytical Motion Blur Rasterization with Compression," In proceedings of High-Performance Graphics, 2010 (pp. 1-10).

Haeberli, P., et al., "The Accumulation Buffer, Hardware Support for High-Quality Rendering," In Computer Graphics (Proceedings of SIGGRAPH Dallas), Aug. 6-10, 1990, vol. 24, No. 24, (pp. 309-318).

Taiwan Search Report issued in corresponding TW100147979 dated Jul. 6, 2015 [w/English translation] (2 pages).

* cited by examiner

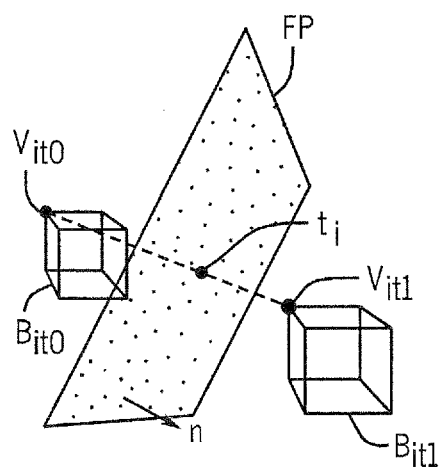
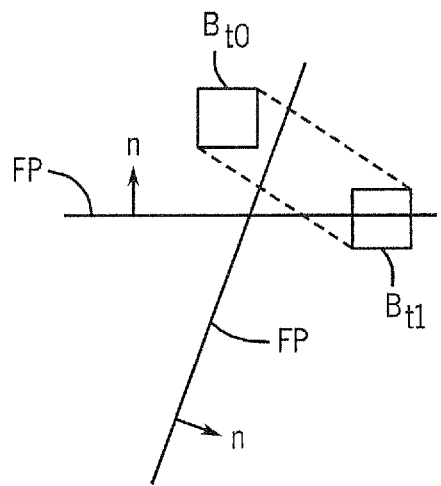
FIG. 3A          FIG. 3B
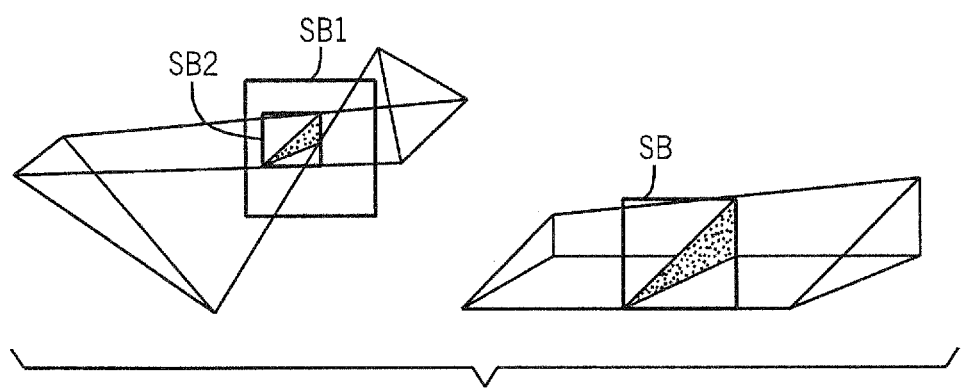
FIG. 4

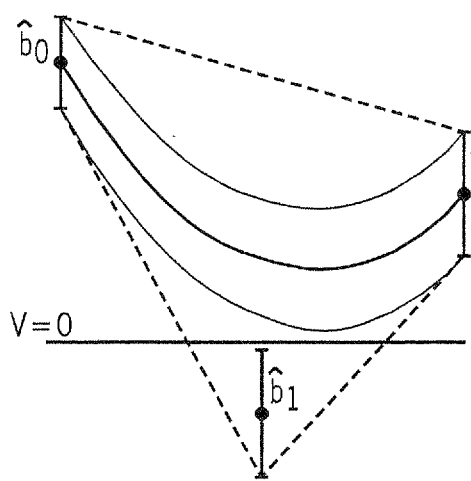
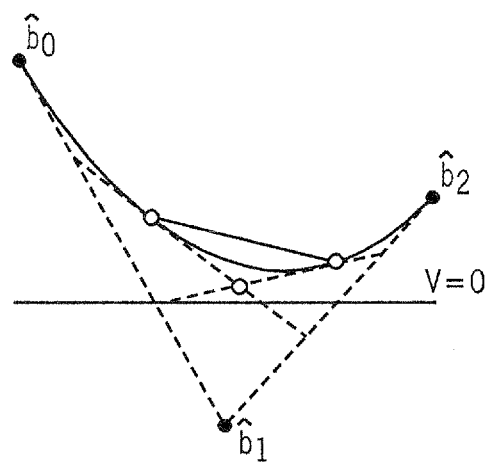
FIG. 7A  FIG. 7B
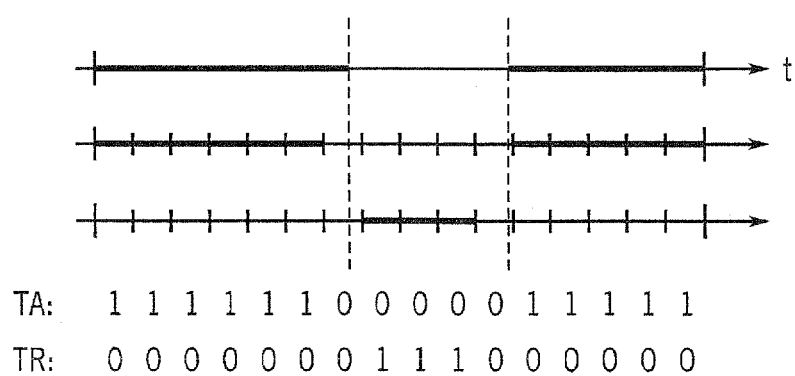
TA:  1 1 1 1 1 1 0 0 0 0 0 1 1 1 1 1
TR:  0 0 0 0 0 0 0 1 1 1 0 0 0 0 0 0
FIG. 8

HIERARCHICAL MOTION BLUR RASTERIZATION

CROSS-REFERENCE TO RELATED APPLICATIONS

This application is a continuation of U.S. patent application Ser. No. 13/033,741, filed on Feb. 24, 2011.

BACKGROUND

This relates to graphics processing and particularly to the graphical depiction of motion blur.

Motion blur is an important visual effect that reduces temporal aliasing and makes moving content appear smoother. However, efficient rendering of motion blur in real-time three-dimensional graphics is nontrivial.

In stochastic rasterization of motion blur, moving geometric primitives are sampled in both space and time, using a large set of samples to obtain high-quality motion-blurred images with low noise levels. For each of the sample positions, an inside test is executed to determine whether the moving primitive covers the sample. This overlap test in x, y and t space is generally more expensive than an inside test in traditional rasterizers.

BRIEF DESCRIPTION OF THE DRAWINGS

FIG. 3a is a depiction of a test of each frustum plane against the vertex furthest in the negative direction relative to the plane's normal, in order to find out if the moving box overlaps the frustum;

FIG. 3b shows a case where the box is only briefly inside the far plane, while it is inside the other plane only towards the opposite end of the movement;

FIG. 4 shows the difference in bounding tightness between the swept box computed by linear interpolation between time 0 and time 1 and the swept axis aligned bounding box tightly bounding the triangle at every time;

FIG. 7a shows that three control points projected on the four tile corner vectors result in intervals for each of the $b_i$ coefficients;

FIG. 7b shows subdivision of the Bézier curve to make a tighter test;

FIG. 8 shows conservative rasterization of time intervals resulting in two bitmasks that are strictly inside or outside;

DETAILED DESCRIPTION

For performance reasons, it is desirable to reduce the set of samples being tested so that only the samples potentially overlapping the moving primitives are tested. This may be done by dividing the sampling space into temporal or spatial sub-regions, and computing coarser overlap tests for these regions. These tests can be used to discard large sets of samples at a coarse level, thereby avoiding many per-sample inside tests.

```
A stochastic rasterizer can be described as:
for each triangle
    BBOX = Compute triangle bounding box
    for each sample in BBOX
        Test sample against triangle
```

Each vertex of a triangle is moving in space, so computing a tight bounding box and visibility-testing the moving triangle in three-dimensional space spanned by the spatial and temporal dimension can be difficult. It is desirable to reduce the volume of tested samples in order to improve efficiency. The stochastic rasterization method may focus on the Compute triangle bounding box step, using an object oriented bounding box (OBB) or convex hull for a tight fitting bounding volume enclosing the moving triangle in screen space. Interval-based rasterization partitions the time domain and bounds each stratum individually. Rasterization based on interleaved sampling is similar, but only a fixed number of discrete times are used.

A hierarchical motion blur traversal algorithm traverses the screen space region covered by a blurred triangle tile by tile. For each tile, the time overlap with the moving triangle is computed. Then, all samples within the overlapping tiles and time segments are tested against the moving triangle. The algorithm can be summarized as:

```
for each triangle
    BBOX=Compute triangle bounding box
    for each tile in BBOX [hierarchical traversal]
        TIME = Compute time segment of overlap
        for each sample in tile within TIME
            Test sample against triangle
```

Figure 1:
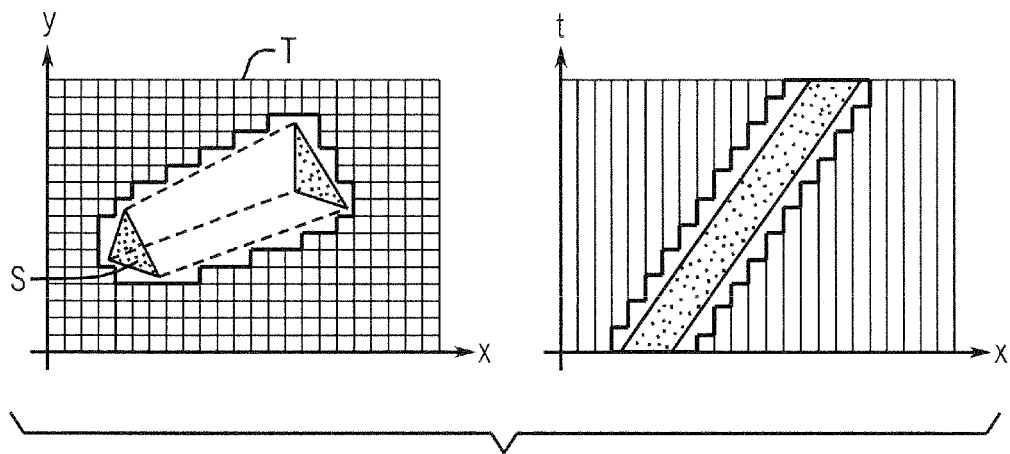
FIG. 1 is a graph of motion blur rasterization according to one embodiment.

The computation of per-tile time bounds can greatly reduce the number of temporal samples that are tested for fast-moving triangles, as large subsets of the temporal samples within the tile can be discarded. FIG. 1 shows that the screen may be divided into a number of tiles T and each tile is tested against the moving triangle S. The tile test computes conservative time bounds for the overlap between the screen space tile and the moving triangle, which may significantly reduce the number of individual sample tests. The region where the per sample tests are performed is the region marked in white that is enclosed by the bold line in FIG. 1. The left figure shows the spatial domain and the right figure shows the temporal domain.

For present purposes, the focus is on the "TIME=Compute time segment of overlap" step in the code above. The output for a certain tile is either trivial reject or a conservative time segment where overlap possibly occurs. In some cases, a trivial accept test can be performed as well to determine that the tile overlaps the triangle at all times.

At a general level, this algorithm may be understood as testing a set of moving bounding planes, bounding one or a collection of individual primitives, against a screen space tile. The moving planes may either be the edges of the moving triangle in two-dimensional homogeneous space, or planes of an arbitrary bounding box enclosing the moving triangle. In many cases, it is convenient to consider the extension of the screen space tile into a frustum in three-dimensional space. The sides of the tile then define the tile frustum planes, against which we can test the moving primitive. Upon selection of coordinate frames and bounding planes, some of the incurred costs of the tests can be significantly reduced, while still providing high-quality spatial and temporal bounds.

Figure 2:
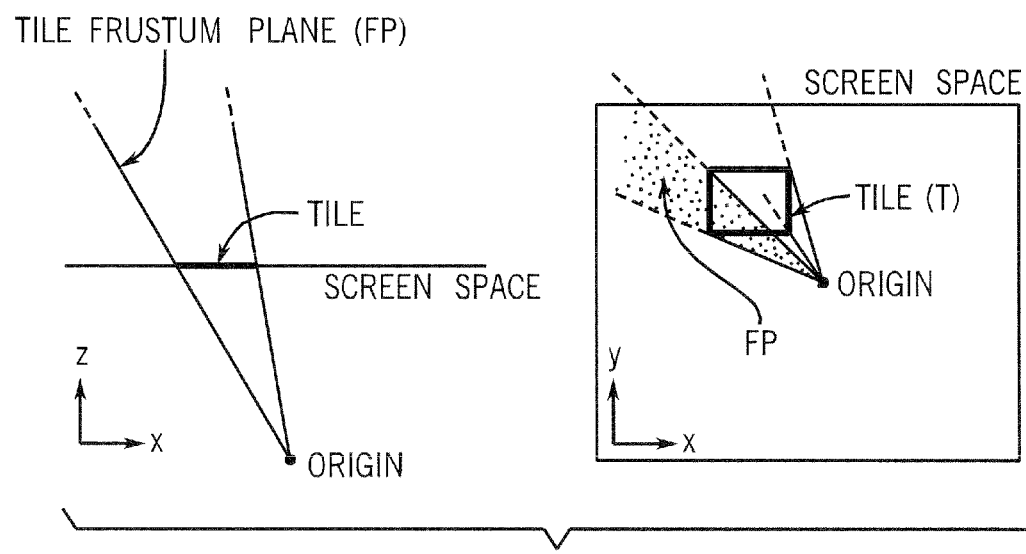
FIG. 2 is a depiction of a tile in screen space according to one embodiment.

FIG. 2 shows a tile in screen space, i.e., the xy-plane, that defines a frustum in three-dimensional space. Each of the four sides of the tile T extends into a unique tile frustum plane FP, and the intersection of these planes make up the frustum. The left figure shows the situation from above, projected in the xz-plane, and the right figure shows it from in front. When working in two-dimensional homogeneous coordinates, the z-axis is replaced by w and the planes are defined in xyw-space. In some cases, it may be desirable to add two additional frustum planes representing the near and far clipping planes, respectively.

The tests are divided into two categories. TileBox denotes tile versus moving bounding box overlap tests, where bounding planes enclosing the moving primitive are overlap tested against the screen space tile frustum. If the bounding planes are aligned with frustum planes, the test can be optimized.

The other category, denoted TileEdge, represents tile versus moving triangle edge overlap tests, where the corners of the screen space tile are tested against the moving triangle edge in two-dimensional homogeneous space. With linear vertex motion, each triangle edge sweeps out a bilinear patch, which makes the overlap test slightly more expensive than the TileBox test.

The TileBox test is typically less expensive and can be applied to both individual triangles and a group of triangles. The TileEdge test comes with a slightly higher cost and can only be applied to individual triangles, but the bounds are often tighter for slowly moving triangles. The two tests can be combined by first executing the TileBox test for each plane of the tile frustum, followed by the TileEdge test for the three triangle edges against the tile corners. In some embodiments, the order of the two tests can be reversed. The resulting bounds are tight and the combined test is robust for scenes with various triangle sizes and motion.

For a given screen space tile, the moving box/edge overlap tests can either trivially reject (TR) a tile or reduce the number samples that need to be tested. Some of the TileEdge tests can additionally be used to trivially accept (TA) a set of samples within the tile, saving hierarchical traversal steps on finer levels.

Figure 11A:
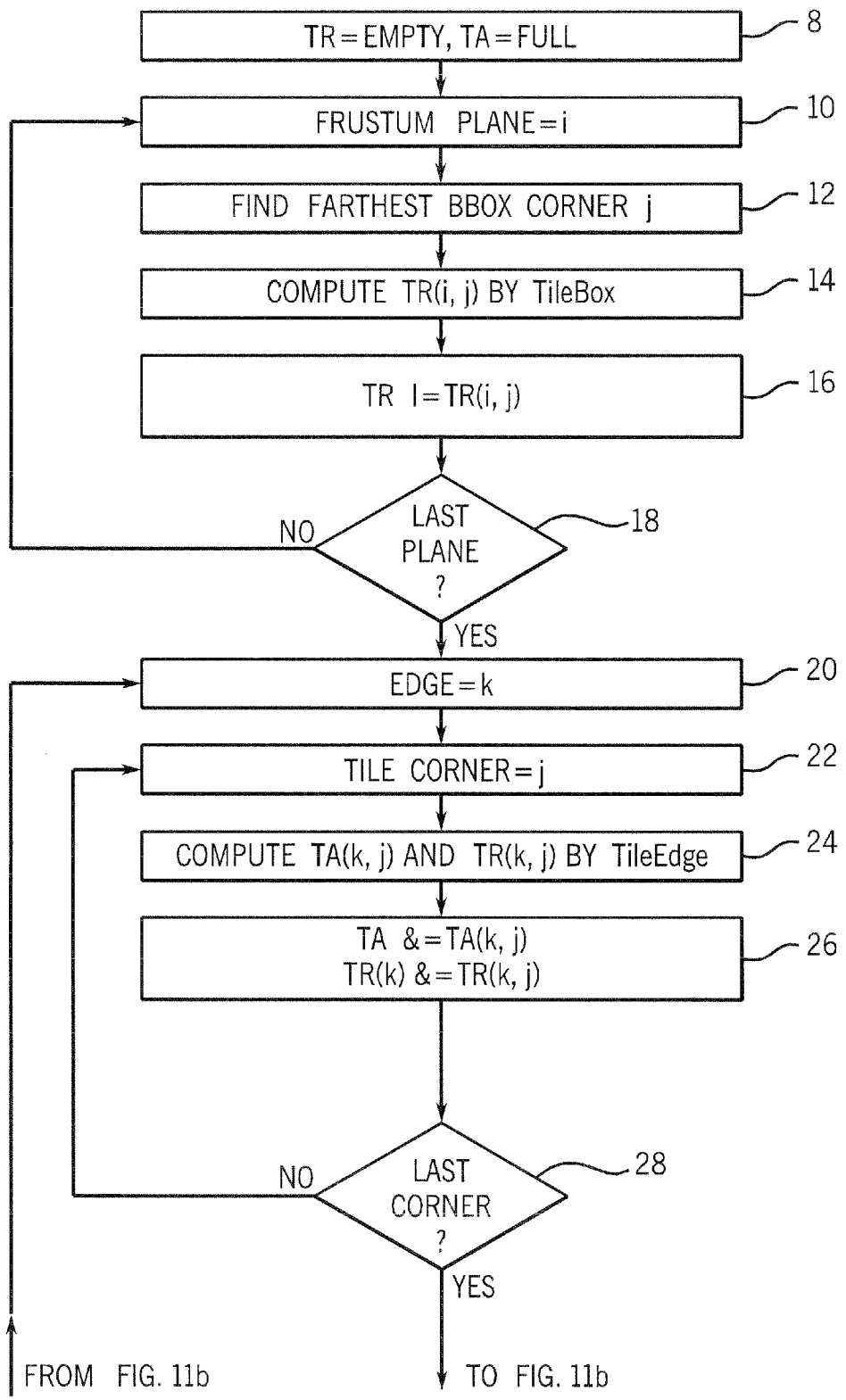
FIGS. 11a and 11b are flowcharts for one embodiment.
Figure 11B:
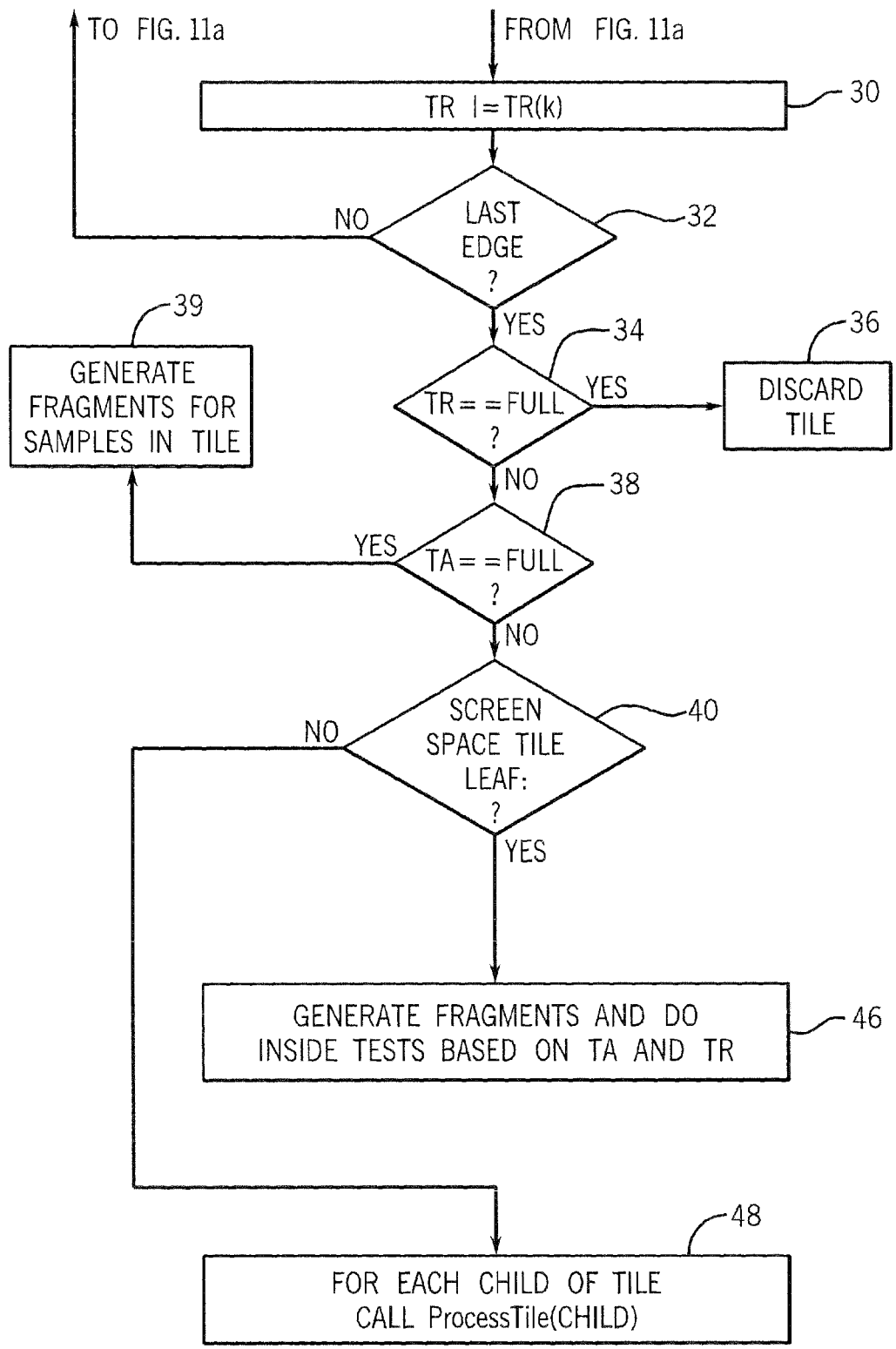

The TileBox and TileEdge tests may be implemented by the sequence illustrated in FIGS. 11a and 11b. This sequence may be implemented in software, firmware, or hardware, for example. This sequence illustrates the operations performed by the function ProcessTile( ) in the pseudo code below. In FIGS. 11a and 11b the operation "|" computes the union of time intervals, and "&" computes the intersection. Additionally, similar to the C programming language, in the pseudo code, A=A|B is written A|=B, and A=A & B is written A &=B, for example.

Initially, at block 8, the value TR is set equal to empty and TA is set equal to full. Then, at block 10, the frustum plane is set equal to i. Then in block 12, the farthest bounding box corner j is found. Next, the value TR(i,j) is computed using TileBox, as indicated in block 14. Then, TR is set equal to the union of TR and TR(i,j), as indicated in block 16. A check at diamond 18 determines whether this is the last plane. If not, the flow iterates.

Otherwise, the flow goes on to set the edge equal to k, as indicated in block 20. The tile corner is then set equal to j in block 22. TA(k,j) and TR(k,j) are computed using TileEdges, as indicated in block 24. Then, TA is set equal to the intersection of TA and TA(k,j), and TR(k) is set equal to the intersection of TR(k) and TR(k,j) in block 26. A check at diamond 28 determines whether this is the last corner. If not, the flow iterates back to block 22. Otherwise, it proceeds to FIG. 11b.

In FIG. 11b, TR is set equal to the union of TR and TR(k) in block 30. Then a check at diamond 32 determines whether this is the last edge. If not, the flow goes back to block 20 in FIG. 11a. If it is the last edge, then the flow goes on to determine whether TR is full in diamond 34. If so, the tile is discarded, as indicated by block 36. Otherwise, a check at diamond 38 determines whether TA is full. If so, the fragments for samples in the tile are generated in block 39. Otherwise, a check at diamond 40 determines whether the screen space tile is a leaf. If so, the fragments are generated and the inside tests are d1 based on TA and TR, as indicated in block 46. Otherwise, for each child of the tile, ProcessTile(CHILD) is called recursively, as indicated in block 48.

In the pseudocode below, the trivial reject (TR) and trivial accept (TA) refer to subsets of a three-dimensional spatio-temporal sampling space that can be trivially accepted or rejected respectively. The subsets are defined by:

$$[X_{min},X_{max}]x[Y_{min},Y_{max}]x[t_{min},t_{max}].$$

The spatial extents are naturally given by a hierarchy of screen space tiles, and the temporal extents are computed by the tile tests. The temporal extents can be stored as exact time intervals or time intervals conservatively discretized into bit masks. In the pseudocode below, the operation|computes the union of time intervals, and & computes the intersection. Implementation of these depend on how the time intervals are stored. For example, if discretized bit masks are used, they may be formed using the simple logical bit operations OR and AND, respectively At a high-level, a hierarchical traversal algorithm using both tests can be written as follows:

```
for each triangle
    BBOX= Compute triangle bounding box
    for each tile in BBOX
        call ProcessTile(tile)
``` where the function ProcessTile is implemented as:

```
ProcessTile(tile)
{
    TR=empty
    TA=full
    for each frustum plane i           // TileBox
        j=find farthest bbox corner
        Compute TR(i,j) by TileBox
        TR |= TR(i,j)
    for each triangle edge k           // TileEdge
        for each tile corner j
            Compute TA(k,j) and TR(k,j) by TileEdge
            TA &= TA(k,j)
            TR(k) &= TR(k,j)
        TR |= TR(k)
    if TR==full
        discard tile
    else if TA==full
        generate fragments for all samples in tile
    else
        if tile is a leaf
            for all samples in TA
                generate fragments
            for all samples not in (TA & TR)
                do inside tests
        else
            for each child of tile
                call ProcessTile(child)
```

In the code above, we can also perform early discards of the tile, if TR indicates that the tile can be rejected for all times. This is only one possible way of combining the tests and performing the traversal.

We now discuss overlap tests between the screen space tile and a linearly moving bounding box of a primitive with linear per-vertex motion. The moving bounding box has the vertices $q_i$ and $r_i$ at t=0 and t=1, respectively. Its vertices at any given time t are given by linear interpolation as $p_i(t)=(1-t)q_i+tr_i=q_i+t(r_i-q_i)$ where the term $r_i-q_i$ is a motion vector that can be precomputed when the bounding box is set up. A linearly moving bounding box is conservative but makes the time overlap tests less expensive.

Different variants of the tests can be applied in three-dimensional spaces including Euclidean space, two-dimensional homogeneous space or two-dimensional screen space. The tests in two-dimensional homogeneous space are the same as in Euclidean space except that the z-component is replaced by w. The general test of the moving object-oriented bounding box (OBB) against a set of tile frustum planes is discussed first, followed by optimized variants for common cases, such as moving axis aligned bounding boxes (AABB) in three or two dimensions.

Based on a tile on screen, four frustum planes FP may be aligned to the sides of the tile, as shown in FIG. 2. In addition, two planes representing the near and far clipping planes, respectively, are added. Each frustum plane, $\Pi_i$, is defined by its plane equation $n_i \cdot p + d_i = 0$, where $n_i$ is the plane's normal and $d_i$ an offset. A point p is outside the plane if $n_i \cdot p + d_i$ is greater than 0. If a point is inside all the planes then it is inside the frustum.

It is desirable to test the frustum planes against a linearly moving object-oriented bounding box, and optionally compute a conservative time segment in which the box may intersect the frustum. First, the frustum planes are transformed into the local frame of the object-oriented bounding box, which reduces the problem to plane-moving axis aligned bounding box tests. In the general case, the transformation of a plane, $\pi_i=[n_{ix},n_{iy},n_{iz},d_i]^T$ into a transformed plane, $\pi'_i$, is given by $\pi'_i=(M^{-1})^T \pi_i$ where M is the 4×4 matrix transforming a point in the frustrum's coordinate frame to the oriented bounding box's coordinate frame.

For static geometry, it is enough to test a corner of the axis aligned bounding box that is farthest in the negative direction (n-vertex) relative to $\Pi_i$ in order to determine if the box intersects the plane. The same holds true for a linearly moving bounding box, as the orientation of the bounding box and the frustum planes remain constant during the motion. The sign bits of the plane's normal $n_i$, correctly decides which corner is the n-vertex.

In FIG. 3A, we have two bounding boxes $B_{it0}$ and $B_{it1}$ on either side of a frustum plane FP. We test the frustum plane FP against the vertex farthest in the negative direction relative to the plane, in order to find out if the moving box overlaps the frustum plane FP. The vertex moves from $V_{it0}$ to $V_{it1}$ during the motion. We may additionally solve for the time of the intersection $t_i$.

The trivial reject test returns true if the tile can be trivially rejected because the moving bounding box never overlaps with the tile, and false otherwise. The bounding box vertices for the axis aligned bounding box at time t=0 are denoted as $q_i$ and the corresponding vertices at time t=1 are denoted as $r_i$. The n-vertex of the moving axis aligned bounding box is given as: $p_n(t)=(1-t)q_n+tr_n$ where $t\in[0,1]$. To determine if a bounding box intersects the frustum plane, we test two points $p_n(0)=q_n$ and $p_n(1)=r_n$ against the plane. If both are outside, we can trivially reject the box as it can never be inside, giving the following simple inside test:

```
boolMovingBoxOverlapsTile( )
{
    for each frustum plane i=1..6
    {
        d0 = dot(n_i,q_n) + d_i
        d1 = dot(n_i,r_n) + d_i
        if (d0>0 && d1>0) return false
    }
    return true
}
``` where n_i represents the transformed frustum plane normals. It is not necessary for the plane equations to be normalized. A hardware implementation can exploit this by setting up plane normals that always have one component equal to 1.0, thereby avoiding one multiplication per dot product. Additionally, the comparisons are normally done by moving $d_i$ to the right hand side of the comparison, reducing the cost to four multiply/adds (MADDs) per frustum plane. Another optimization is to exploit the fact that the near and far planes are parallel. Hence, it is only necessary to compute the dot product $q_n \cdot n_i$ and $r_n \cdot n_i$ once for these two planes and then use different $d_i$.

The time overlap test first performs a trivial reject test, and then computes the time overlap between the moving bounding box and the tile frustum. If the test passes, it returns a conservative time segment over which the moving bounding box potentially overlaps with the tile. This can be used to guide the traversal, for example, in a hierarchical motion blur rasterizer.

The point of intersection in time between the moving n-vertex and the plane is given by:

$$n_i \cdot ((1-t)q_n + tr_n) + d_i = 0 \quad (1)$$
$$\Leftrightarrow t = \frac{d + n_i \cdot q_n}{n_i \cdot q_n - n_i \cdot r_n}.$$

The numerator and both terms in the denominator are needed in the trivial reject test, so the additional cost is a subtraction and division. The division can be made in a very low precision in hardware, as long as the result is always conservatively rounded.

For the combined overlap test for all frustum planes, we start with the full interval $[t_{min},t_{max}]=[0,1]$ and progressively refine it using minimum and maximum operations. If the interval ever becomes empty, i.e., $t_{min}$ is greater than $t_{max}$, we can make an early out as there is no point in time where the moving box overlaps the frustum. This catches some of the cases, which would normally be falsely classified as inside. An example is shown in FIG. 3B. In FIG. 3B, the box is only briefly inside the far plane, while it is inside the other plane only towards the opposite end of the movement. There is no point in time where it is inside both planes simultaneously, hence a false positive is avoided. The following pseudocode illustrates the algorithm:

```
boolMovingBoxOverlapsTile(float&t_min, float&t_max)
{
    [t_min,t_max] = [0,1]
    for each frustum plane i=1..6
    {
```

-continued

```
        //Trivial reject test
        d0 = dot(n_i,q_n) + d_i
        d1 = dot(n_i,r_n) + d_i
        if (d0>0 && d1>0) return false
        //Time overlap test
        if (d0>0)          // p_n moves from out to in
            Compute t
            t_min = max(t_min, t)
        else if (d1>0)     // p_n moves from in to out
            Compute t
            t_max = min(t_max, t)
        // else: both inside, no need to update times
        if (t_min>t_max) return false // early-out
    }
    return true
}
```

For the hierarchical tests, in the above two algorithms, we have assumed that all six frustum planes need to be tested. However, if the tests are applied hierarchically, computations can often be saved. There are two different cases depending on what kind of hierarchy is used.

First, if the screen has a hierarchy of smaller children tiles, these will in general share one or more of their parent tiles' frustum planes. The result of the trivial reject test and the time overlap computations can be reused for such planes. For example, if a screen space tile is subdivided into four smaller tiles, each such tile shares two frustum planes with the larger tile. In addition, the near and far frustum planes are the same for all tiles, so they only need to be tested once for each bounding box.

Second, if the tests are applied to a hierarchy of moving bounding boxes, such as in ray tracing applications, and at some stage a moving bounding box is entirely inside a frustum plane, it is unnecessary to test its children boxes against the same plane, as these are guaranteed to be inside as well. Doing this at every hierarchical level and masking out the relevant planes requires testing the vertex farthest in the positive direction (the p-vertex) against the planes at time t=0 and t=1, which essentially doubles the cost of the test and generally does not pay off. However, the moving patch rarely intersects the near/far planes so we start by testing the p-vertex against these at the root level, and continue with the less expensive four sided frustum traversal, if possible.

When determining if a moving triangle with linear vertex motion overlaps a screen space tile, we can bound the moving triangle with a moving axis aligned bounding box aligned with the camera coordinate frame, instead of the moving OBB as in the previous discussion. This gives coarser bounds, but the test is less expensive.

The following observations make the test more efficient. The tile frustum planes do not need to be transformed into the bounding box's coordinate frame. Four of the frustum planes pass through the origin. All frustum plane normals have at least one component equal to 0 and, due to the scale invariance, we can set one other component to 1 as above. Hence, each involved dot product with a frustum plane normal reduces to a single MADD operation.

Using these observations, optimized versions of the trivial reject test and the time overlap test can be written. The only differences are that the frustum planes do not need to be transformed, and that the general dot products are replaced by more efficient computations. As an example, equation 1 for the right frustum plane passing through the point (x,0,1) in two-dimensional homogeneous coordinates, thus with an outward normal of n=(1,0,-x) and d=0, simplifies to:

$$t = \frac{d + n_i \cdot q_n}{n_i \cdot q_n - n_i \cdot r_n} = \frac{q_x - xq_w}{x(r_w - q_w) - (r_x - q_x)} \quad (2)$$

The other frustum planes have similar equations.

We can also add more bounding planes. If we bound our primitive in a coordinate system rotated 45° around the w-axis, we can test for time overlap in a rotated coordinate system with axes defined by x−y and x+y. This makes the computed time overlap tighter for diagonally moving primitives than if only an axis aligned bounding box is used.

The tests discussed above describe linear per vertex motion in three dimensions, which is the general case and avoids the complex problem of clipping moving primitives against the view frustum. When projected to screen space, linear movement of the vertex becomes a rational linear function, making the overlap test more complex. However, for the special case of linear per-vertex motion in screen space, the overlap test can be further simplified. This may be useful in some applications that are working with primitives moving linearly in screen space.

The moving triangle in screen space may be bound using a two dimensional axis aligned bounding box, and the intersections with the frustum planes defined by the tile borders are computed. For example, the right tile border at a coordinate x defines a frustum plane with n=(1,0,0) and d=−x. Equation 1 reduces to:

$$t = \frac{d_i + n_i \cdot q_n}{n_i \cdot q_n - n_i \cdot r_n} = \frac{q_x - x}{q_x - r_x}$$

where the denominator can be pre-computed. Similar equations apply to the other frustum planes. Thus, the time of intersection for a moving axis aligned bounding box against the frustum plane can be obtained using a single MADD operation.

The tile versus moving bounding box tests bound the moving triangle using a bounding box that is linearly interpolated from tight bounding boxes at t=0 and t=1. Hence, the vertices of the bounding box move linearly, which simplifies the tests. It should be noted that the moving bounding boxes are, in general, overly conservative. There are two reasons for this.

First, depending on the motion of the individual triangle vertices, the bounding box is in some cases not tightly enclosing the triangle at a given time t between the two end points in time. This happens when the vertices change order, with respect to the coordinate axes of the bounding box, during the course of motion. A tighter bounding box could be achieved if we, for each time t, position the triangle and compute tight bounds. FIG. 4 shows an example in two dimensions highlighting the difference in bounding tightness between a linearly moving bounding box and a bounding box tightly bounding the triangle at every time t. If the paths of the moving triangle vertices intersect, as they do in the left figure, the box SB2 is tighter than the linearly moving box SB1. However, for scaling and translations, as in the right figure, the linearly moving bounding box provides tight bounds SB.

Figure 5:
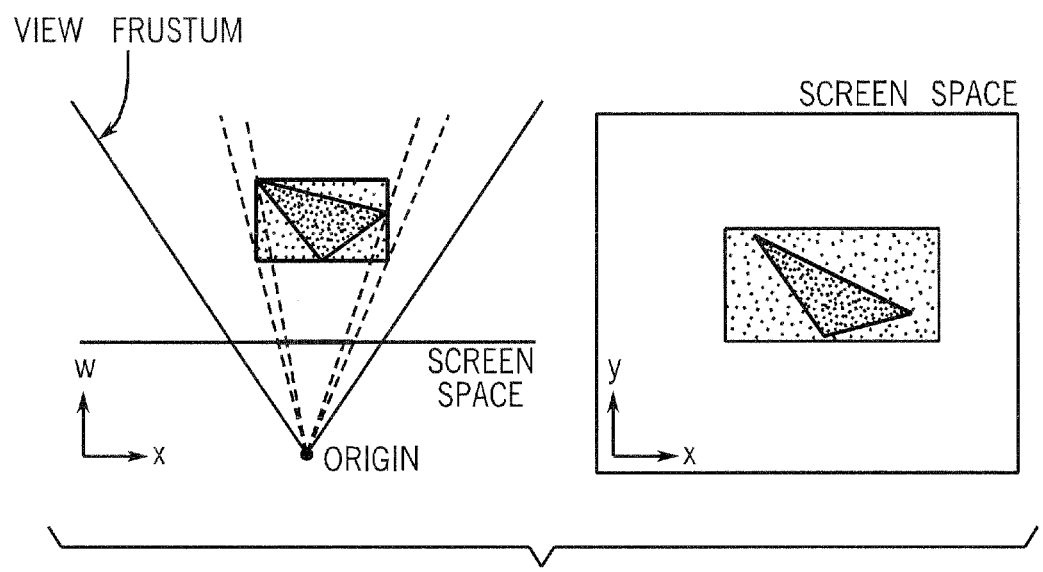
FIG. 5 shows a bounding box projected in screen space according to one embodiment.

Second, when the bounding box in three-dimensional or two-dimensional homogeneous space is projected to screen space, the projection in general does not tightly bound the triangle. This is a general problem with the projection of bounding boxes, not one specific to our use of linearly moving bounding boxes. FIG. 5 illustrates an example in two-dimensional homogeneous coordinates. In this case, tighter screen space bounds can be achieved by bounding the triangle's vertices at each time after a division by w. The bounding box is now defined by piecewise rational polynomials of degree one. It would be possible to intersect these against the screen space tile to compute tighter bounds in time, but the computational cost would be higher.

When the triangle's vertices move linearly in three dimensions, each triangle edge sweeps out a bilinear patch. The corresponding time dependent edge functions are quadratic in time t. To determine if a screen space tile overlaps with the moving triangle, we can evaluate the triangle's three time dependent edge equations for the four corners of the tile and check if any corner is inside all three edges. Also, if we can determine reduced time ranges in which the triangle overlaps the tile, the number of per sample inside tests can be reduced.

There are four variants of the test that determines the temporal overlap of the screen space tile and a moving triangle. The first test is based on analytically computing time intervals where the tile overlaps. This method computes the tightest time intervals, but it may be somewhat expensive. The second test also solves the second-degree polynomial analytically for each tile corner, and uses wide bitmasks to efficiently compute the trivial accept or reject masks. The third version is an optimized test based on Bézier clipping, which efficiently computes conservative time overlaps. A linearized moving edge test is also presented in this category. The fourth variant of the test uses interval arithmetic to avoid solving for overlap at each tile corner individually. This test also computes overly conservative time intervals.

With time-continuous triangles, each vertex, $p_i$, moves linearly from the position $q_i$ at t=0, to $r_i$ at t=1, i.e.:

$$p_i(t)=(1-t)q_i+tr_i.$$

All computations are performed in the orthographic projection of the vertices in two-dimensional homogeneous coordinates, with a vertex defined as p=(x, y, w). Similar tests can, however, be derived for the case of triangles moving linearly in screen space, that is two-dimensional instead of two-dimensional homogeneous space.

The edge equations for time-continuous triangles (TCTs) can be written as follows:

$$e(x,y,t)=a(t)x+b(t)y+c(t)$$

where (x,y) is a sample position in screen space, t is the time parameter, and a,b,c are quadratic polynomials in t, for example, $a(t)=a_2t^2+a_1t+a_0$. Thus, we can rewrite the edge equation as:

$$e(x, y, t) = (a_2x + b_2y + c_2)t^2 + (a_1x + b_1y + c_1)t + (a_0 + b_0 + c_0) \quad (3)$$
$$= \alpha t^2 + \beta t + \gamma.$$

Hence, for a specific sample position, (x,y), we can solve for t to find the time intervals (if any) where e is less than 0. The roots to e=0 are:

$$t = \frac{-\beta \pm \sqrt{\beta^2 - 4\alpha\gamma}}{2\alpha}. \quad (4)$$

If $\beta^2-4\alpha\gamma$ is less than 0, there are no real roots and the entire time range is inside if e"=$2\alpha$<0 or outside if e">0 is positive. When $\beta^2-4\alpha\gamma$ is negative, both $\alpha$ and $\gamma$ must be nonzero, so $\alpha \neq 0$ for this case.

Otherwise, we have a maximum of two roots and there will be up to two time intervals per edge, $\hat{i}_i=[\underline{t},\bar{t}]$ (possibly including plus and minus infinity), where the point (x,y) is on the inside of the edge and e is less than 0. Note, we use $\underline{t}$ and $\bar{t}$ to denote the lower/upper boundaries of the time interval, respectively. The time overlap, $\hat{.t}$, between a point (x,y) and a moving triangle edge is given as the union of these intervals.

Figure 6:
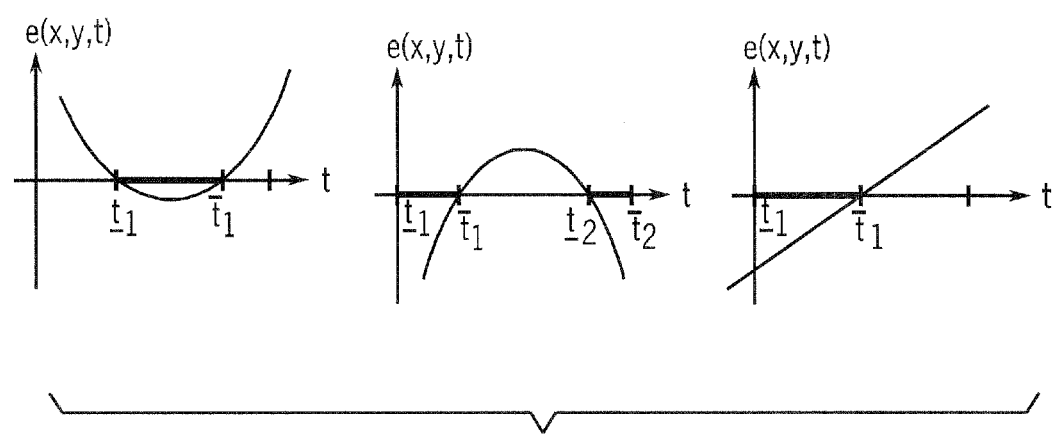
FIG. 6 shows edge equations as functions of t for a specific screen space location.

In FIG. 6, edge equations are shown as functions of t for a specific (x, y) location. We are interested in finding the time intervals where e is less than 0.

With the basic operation of computing the time overlap between a point and the moving edge, a variety of tile tests can be implemented. We compute the time overlap at the tile's four corners. Let, $\hat{t}_{jk}$ be the overlap at a corner j∈{1,2,3,4} for edge k={1,2,3}. Each $\hat{t}_{jk}$ can consist of up to two distinct time intervals. The time intervals where a tile potentially overlaps with the TCT are given by:

$$\hat{t}_{tile} = \bigcap_k \left( \bigcup_j \hat{t}_{jk} \right) \quad (5)$$

The rationale for this is that the inner part, $$\bigcup_j \hat{t}_{jk},$$

computes the time intervals when any part of the tile is inside the edge k, and the intersection of these gives the time intervals the tile is potentially inside all three edges. All samples with time $t \notin \hat{t}_{tile}$ can be trivially rejected. We can test for fine-grained trivial reject after each iteration of the outer loop over edges, namely after each $$\bigcup_j \hat{t}_{jk}$$

has been computed. The time intervals computed by the above equation may be overly conservative and the test is subject to false positives. Hence to get tighter time bounds, it is desirable to combine it with the tile-moving bounding box test.

It is also possible to compute the time intervals when the tile can be trivially accepted by taking the intersection of all $\hat{t}_{jk}$ as follows:

$$\hat{t}_{TA} = \bigcap_k \left( \bigcup_j \hat{t}_{jk} \right) \quad (6)$$

Namely, the times of all tile corners being inside all three edges. In practice, it may be difficult to work with time intervals directly, as the number of discrete intervals may grow with union/intersection operations. One possible implementation is to let dedicated hardware, designed to the maximum number of discrete intervals that can occur, handle union/intersection of intervals. Interval boundaries may additionally be stored using fixed-point with a small number of bits to save computations.

For the quantization of time intervals, we assume the sample domain is divided into N bins in time, where for example N=32 if 32-bit masks are used, where bin i= $\{0, \ldots, N-1\}$ holds samples with times t∈[i/N,(i+1)/N].

For a given screen-space position, (x,y), and triangle edge k, we first solve for the time ranges where e<0 as described above and then conservatively rasterize these into a one-dimensional bit mask with N bits. This step is easy to do with bit operations. The bit position of the lower limit (inclusive) is given by $\underline{b}$=⌈tN⌉, and the upper limit (exclusive) $\overline{b}$=⌈$\overline{t}$N⌉. These two are easily converted to a bitmasks by the operation $((1<<\underline{b})-1)\oplus((1<<\overline{b})-1)$, i.e., the XOR between the two bit masks with ones from bit 0 up to bit $\underline{b}$−1 and $\overline{b}$−1 respectively, followed by zeros.

The result is a bit mask, $TA_k$, for each edge k={1, 2, 3} which indicates over which time bins the point (x,y) is guaranteed to be on the inside of the edge. The mask can have up to two disjoint sequences of ones, for example $TA_k$=1111110000011111 (where N=16). We similarly compute an opposite mask, $TR_k$, which indicates in what time bins the point is guaranteed to be outside the edge, i.e., where e>0, for example $TR_k$=0000000111000000. Note that bits that are 0 in both masks indicate bins in which the point (x,y) goes from being inside to outside an edge or vice versa, as illustrated in FIG. 8. In FIG. 8, conservative rasterization of the time intervals result in the two bit masks that are strictly inside (TA) or outside (TR), as depicted in the figure.

Finally, the three masks $TA_k$ are merged into a single inside mask by computing AND of the individual mass as follows: $TA=TA_1 \& TA_2 \& TA_3$. As each of the three edges can have a maximum of two disjoint intervals, TA can, theoretically, have a maximum of four disjoint time intervals. Note that we keep the $TR_k$ masks separate. These four masks indicate which time intervals the sample is guaranteed to be inside the triangle, or outside the respective edge of the triangle.

For hierarchical traversal, the screen space bounding box of the moving triangle is divided into a coarse grid of, for example, 16×16 pixel tiles. For each tile corner, we compute the bit masks $TA_k$ and $TR_k$. We denote the corners of the current tile by the numbers j={1, 2, 3, 4}, the moving edges with the numbers k={1,2,3}, and the respective bit masks $TA_{jk}$ and $TR_{jk}$.

These masks are combined using logical operations into a single trivial accept mask and a single trivial reject mask per tile as described in the pseudocode above, where TA(k,j) and TR(k,j) denote $TA_{jk}$ and $TR_{jk}$, respectively.

Figure 9:
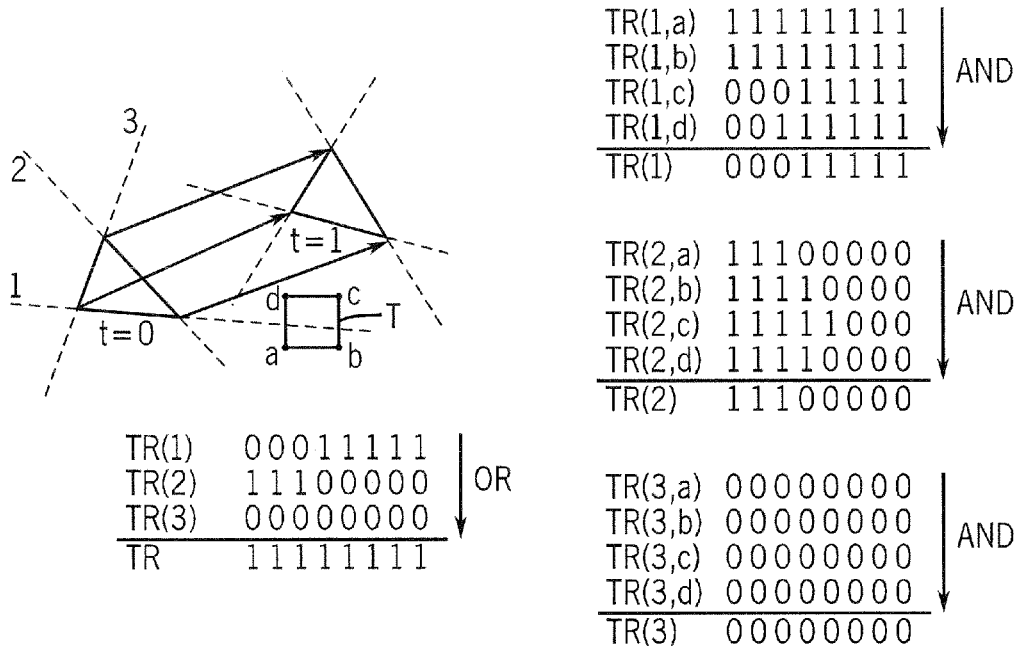
FIG. 9 shows a triangle that moves across a screen space according to one embodiment.

In the code, bits of TA indicate time segments for which the tested tile is guaranteed to be fully covered by the moving triangle. Similarly, TR indicates in which time segments all four tile corners are simultaneously outside one or more edges. If all bits are set, the tile is guaranteed to not overlap the moving triangle and we discard the tile, as shown in FIG. 9. FIG. 9 shows an example of a triangle which moves across the screen as illustrated. The triangle is made up of three time continuous edges marked one, two and three. We are looking at the tile T and compute $TR_{jk}$ bit masks for the corners j and the edges k. Their respective intersections give time segments in which the tile is outside the given edge, as shown on the right. All masks for an edge are ANDed together to find time bins in which the tile can be trivially rejected. The union of the resulting masks indicates time bins for which the tile can be trivially rejected.

Whenever, one of these two conditions is not fulfilled, we hierarchically subdivide the tile until the smallest tile size is reached, for example 2×2 pixels, at which stage inside tests are performed only for the samples in the time bins that cannot be unambiguously classified as trivial reject or trivial accept.

It would be possible to, early in the traversal, start writing out samples for time bins that get classified as trivial accept. However, this would not save computations, as we still need to subdivide and computing the bit masks has a fixed cost per tile corner. It would likely also increase the bookkeeping needed, as we would need to keep track of which time bins have already been written out.

To compute and cache new grid points, when the tile is subdivided, we need to compute the $TA_k$ and $TR_k$ bit masks at each child tile's four corners. Many of these corners may coincide with previously computed positions on the screen, and therefore it is useful to cache and reuse computed bit masks. If the tile is subdivided into four children tiles, bit masks for at most five new locations are computed: one in the center of the tile, and four points halfway along each side of the tile.

If a point lies directly between two points with TA=1 . . . 1, the new point can be directly set to TA=1 . . . 1. If the two endpoints of the line are guaranteed to be within the TCT at all times, then the midpoint must be inside as well. Similarly, for each edge, if $TR_k$=1 . . . 1 at both endpoints, the new midpoint directly gets a value $TR_k$=1 . . . 1. In all other cases, we perform the steps outlined previously to compute the bit masks.

All computed bit masks may be inserted into a cache and reused for any neighboring tiles. The size of the cache may be determined by the number of tiles a coarse tile may be divided into. For example, if we start with 16×16 pixel tiles, and stop at the leaf size 2×2 pixels, there will be $(16/2+1)^2$=81 distinct points. Each point needs to hold four bit masks, assuming the masks are merged before inserting them into the cache. The cache bookkeeping can be handled with an appropriately sized register (e.g. 81 bit register) that keeps track of which locations have been filled in.

In many scenes, the triangles move linearly so that each vertex has the same motion vector which means that quadratic component of the edge equation is often very small. In these cases, directly solving equation 4 for t involves a division with a very small quadratic coefficient which may lead to numerical instability. Thus we provide a test that performs well when the edge equation is near linear and that is conservative and robust when the quadratic terms grow.

The cross product of two vertices in two-dimensional homogeneous space gives the coefficients of the corresponding edge equation. For moving vertices, the cross product can be expressed on Bernstein form as:

$$p_i(t) \times p_j(t) = (1-t)^2 c_0 + 2(1-t)t c_1 + t^2 c_2,$$

where $$c_0 = q_i \times q_j, c_1 = \tfrac{1}{2}(q_i \times r_j + r_i \times q_j) \text{ and } c_2 = r_i \times r_j.$$

Hence, the full time-dependent edge equation is expressed on Bernstein form as:

$$e(t,x,y) = ((1-t)^2 c_0 + 2(1-t)t c_1 + t^2 c_2) \cdot (x,y,1).$$

For a given tile corner $\chi_j = (x_j, y_j, 1)$, the inside test becomes a parametric Bézier curve $e_{x_j,y_j}(t)$ in time with scalar control points $b_i = c_i \cdot \chi_j, i \in \{0,1,2\}$, as follows:

$$e_{x_j,y_j}(t) = \sum_{i=0}^{2} b_i \binom{2}{i} (1-t)^{2-i} t^i.$$

Figure 10:
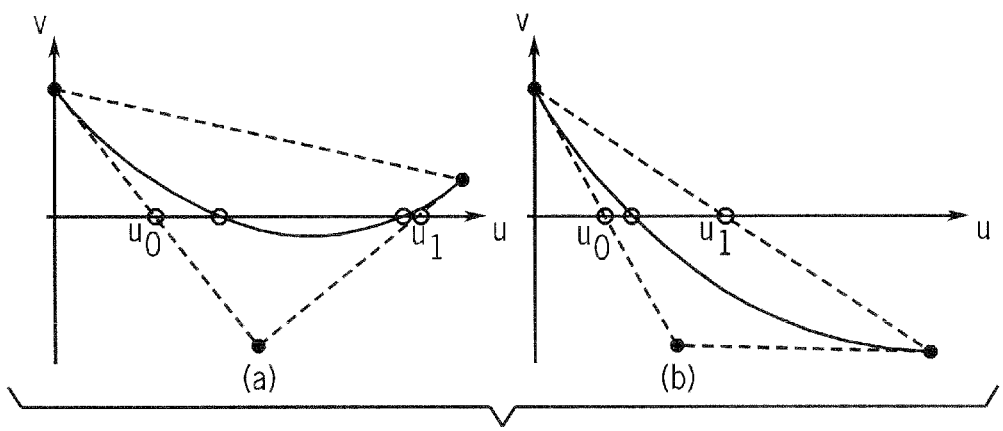
FIG. 10 shows two examples of Bezier clipping.

We search an outer conservative time range in which the tile corner is inside the moving edge, which is equivalent to determining a time range for when the Bézier curve can be negative. For a quadratic Bézier curve, Bézier clipping provides these bounds. This is done by intersection-testing the triangle formed by the three control points with (u,v)-coordinates, (0, $b_0$), (0.5, $b_1$) and (1.0, $b_2$) with the line v=0, shown in FIG. 10. As shown in FIG. 10, conservative intersection times for a quadratic Bézier curve are obtained by intersecting the bounding triangle edges with the line v=0.

For each tile corner, $\chi_j$, tested against the moving edge, $e_k$, k∈{1,2,3}, an outer conservative time range $\hat{t}_{jk}=[\underline{t}_{jk},\bar{t}_{jk}]$ in which the corner is potentially inside the edge can be computed based on the locations/signs of the control points, $b_i$, and the intersection points with v=0. For example, in FIG. 10B, the time interval will be $\hat{t}=[u_0,1]$, as a rightmost control point, (1.0,$b_2$), has $b_2$ less than 0.

Once all three triangle edges have been tested, the temporal overlap, $\hat{t}_{tile}$, between the tile and the moving primitive is given by equation 5. Any samples outside $\hat{t}_{tile}$ can be trivially rejected as before. The test is not as tight as using the analytically computed time overlap, as the bounds $\hat{t}_{jk}$ are overly conservative. If we have a reduced input range in time, t∈[$\underline{t}$, $\bar{t}$]⊂[0,1], the Bézier curve can be re-parameterized using standard Bernstein subdivision for a tighter test, as shown in FIG. 7B.

A faster, coarse trivial reject test for a triangle is obtained by testing if $$\min_i b_i > 0,$$

∀i for any edge. This works since the control points, $b_i$, define the convex hull of the Bézier curve representing the edge equation at a tile corner. If all its control points lie above 0, the edge equation can never be negative and the corner lies outside the edge.

Additionally, we may compute an inner conservative time range, $\hat{t}'_{jk}$, in which the corner is guaranteed to be inside the edge. For example, in FIG. 10B, the inner conservative time interval will be $\hat{t}=[u_1,1]$. Inserting the $\hat{t}'_{jk}$ into equation 6 gives us an overly conservative trivial accept test. It is also possible to define a coarse trivial accept test by testing if $\max_i b_i$<0, ∀i, for all edges.

In a fast bounded edge test, instead of computing $\hat{t}_{jk}$ using Bézier clipping for all four tile corners in the inner loop, we can first project the edge equation control points on each of the four tile corners, and use the lower bounds of the Bézier curve control points, i.e.:

$$b_{i\ min} = \min_j \{c_i \cdot \chi_j\} = \min_j \{b_i\},$$

as control points. Bézier clipping can be applied to this control polygon, resulting in a conservative time range where the moving triangle edge may overlap the tile.

In FIG. 7A the three control points projected on the four tile corner vectors result in intervals for each of the $b_i$ coefficients. A conservative time interval for potential overlap can be derived by testing the control polygon from the lower limits of these intervals against v=0. In FIG. 7B, given an input time interval, the Bézier curve can be re-parameterized, resulting in precise culling and a tighter overlapping time range.

This simplifies the inner loop, but the test is looser than before and we can no longer perform a trivial accept test without additional computations. The trivial accept test needs the upper bound, given by the control points:

$$b_{i\ max} = \max_j \{c_i \cdot \chi_j\} = \max_j \{b_i\},$$

and the additional intersection points with v=0 found by applying Bézier clipping to this new control polygon. The additional cost of also computing a conservative trivial accept test is mostly useful for larger primitives with modest motion, where many overlap tests on finer granularity can be avoided. For large motion and small primitives, the trivial accept test can be omitted.

In a linearized bounded edge test, the per-tile cost of the general edge test can be reduced further by trading bounding accuracy for a faster test. We bound the quadratic edge equations' projection on screen space positions using lines with constant slopes. The slopes of the lines can be computed in the triangle setup. This linearization of the time overlap test greatly reduces the computations needed for each screen space tile. In case of linear edge functions, this test has the same sharpness as the general test using Bézier clipping.

In one embodiment, the slopes of the lines may be computed using Bézier curves and interval arithmetic. Recall that the time-dependent edge equation for edge k can be written on Bernstein form as:

$$e_k(t)=p_i(t)\times p_j(t)=(1-t)^2 c_0+2(1-t)t c_1+t^2 c_2.$$

For a given tile corner $\chi_j=(x_j,y_j,1)$, the distance, d(t), to the moving edge is a parametric Bézier curve:

$$d(t)=e_{xj,yj}(t)=\chi_j \cdot e_k(t),$$

with scalar control points $b_i=\chi_j \cdot c_i$, i∈{0,1,2}. We search for $\min_{t\in[0,1]}d(t)$ for any $\chi_j$ within the moving bounding box of the triangle.

To simplify the per-tile test, we want to linearize the previous equation and write it on the form:

$$d_{lin}(t)=\chi_j \cdot c_0 + \gamma t,$$

where $d_{lin}(t)\le d(t)$, ∀t∈[0,1]. We derive bounds for γ by forming the vectors $k_{10}=2(c_1-c_0)$ and $k_{20}=c_2-c_0$ and finding their smallest value when multiplied with a χ within the screen space bounding box of the moving triangle. Using interval arithmetics, the screen space bounds are expressed as $\hat{\chi}=[\hat{\chi}_x, \hat{\chi}_y, 1]$, and γ is bounded by:

$$\hat{\gamma}=(\hat{\chi} \cdot k_{10}) \cup (\hat{\chi} \cdot k_{20}),$$

which represents the slope of the lower and upper lines bounding the quadratic curve for all χ in the screen space bounding box of the moving triangle.

Note that if the time-dependent edge equation is linear, the interval $\hat{\gamma}$ is a single value, and $d_{lin}(t)=d(t)$. If the edge equation has large quadratic terms, the linear representation is conservative. Note that $\hat{\gamma}$ can be computed in the triangle setup.

Given the lower limit of $\hat{\gamma}$, denoted $\underline{\gamma}$, the per-tile edge test is considerably simplified. By looking at the sign of $c_0$, we only need to test one tile corner χ. A conservative time for the intersection of the moving triangle edge and the tile, $d_{lin}(t)=0$, is given by:

$$t=-\frac{\chi \cdot c_0}{\underline{\gamma}}.$$

Note that $-c_0/\gamma$ can be pre-computed, so computing the time overlap only costs 2 MADD operations per edge. Depending on the sign of $\gamma$, we can thus reduce the computation of the tile's temporal overlap, $\hat{t}_k$, with edge k to:

$$\hat{t}_k = \begin{cases} [\max(0, t), 1] & \text{if } \gamma < 0, \\ [0, \min(1, t)] & \text{otherwise} \end{cases}.$$

Another test can be derived by expressing the screen space tile with interval arithmetic. The moving triangle edge equation (equation 3) can be written as:

$$e(x,y,t)=\alpha t^2+\beta t+\gamma \qquad (7)$$

If we want to test a tile of pixels, we could simply change so that x and y instead are on interval form i.e. $\hat{x}$ and $\hat{y}$. Hence, equation 7 becomes:

$$\hat{e}(\hat{x},\hat{y},t)=\hat{\alpha}t^2+\hat{\beta}t+\hat{\gamma} \qquad (8)$$

where $\hat{\alpha}=[\underline{\alpha},\overline{\alpha}]=a_2\hat{x}+b_2\hat{y}+c_2$. We start by deriving a technique for testing whether the tile, defined by $\hat{x}$ and $\hat{y}$, is outside the triangle for all times inside a certain range $t \in [t_s, t_e]$.

Since we know the range of valid times, we choose to evaluate equation 8 at the start and end of the time range. If $\hat{e}(\hat{x},\hat{y},t_s)<0$ or $\hat{e}(\hat{x},\hat{y},t_e)<0$ we terminate the test, because the moving edge conservatively overlaps with the tile. The conservative test only needs to compute the lower limit of the edge equation, i.e., $\underline{e}<0$ is an equivalent test. These evaluations become particularly simple for t=0, where $\hat{e}(\hat{x},\hat{y},0)=\hat{\gamma}$ and for t=1, where $\hat{e}(\hat{x},\hat{y},1)=+\hat{\alpha}+\hat{\beta}+\hat{\gamma}$.

In addition, if we want to split the full time range, $t \in [0,1]$, into n smaller time ranges with equal size, the evaluation can become even simpler. We simply start at t=0, and the first sub time interval ends at t=1/n. Evaluation of polynomials with uniform steps can be d1 very efficiently with forward differencing. In short, there is a little bit of setup work done, and then a number of additions is all the work per step.

An alternative is to interpolate the vertices to the specific time such as $t=t_S$, and perform a static triangle against tile test using existing techniques to generate tighter tests, but this costs more.

At this point, the tile is outside the edge at $t=t_s$ and $t=t_e$. If we have a minimum occurring in $t \in [t_s, t_e]$, we can still have an overlap. So the next test is to differentiate the edge equation with respect to t twice:

$$\hat{e}'(\hat{x},\hat{y},t)=2\hat{\alpha}t+\hat{\beta},$$

$$\hat{e}''(\hat{x},\hat{y},t)=2\hat{\alpha}t$$

A local minimum can occur only if $\hat{e}''>0$, that is, if $\overline{\alpha}$ is greater than 0. If this is not true, then we cannot have a local minimum and can conclude that the tile is outside this moving edge. If $\hat{\alpha}[0,0]$, the edge equation is not a second-degree polynomial, and so it suffices to test the outside condition $t=t_s$ and $t=t_e$.

The local minimum occurs inside a time interval $\hat{t}$ determined by $\hat{e}'=2\hat{\alpha}\hat{t}+\hat{\beta}=0$. If the solution is guaranteed to be $\hat{t}<t_s$ or $\underline{t}>t_e$, then the minimum occurs outside the range of interest, and hence the tile will not overlap. The solution is:

$$\hat{t} = \frac{-\hat{\beta}}{2\hat{\alpha}} = -\frac{1}{2}\frac{[\underline{\beta}, \overline{\beta}]}{[\underline{\alpha}, \overline{\alpha}]},$$

where we already know that $\overline{\alpha}0$. If $\underline{\alpha} \leq 0$, then the denominator contains a 0, and the division results in the infinite interval and our test cannot prove anything and so we will conservatively assume that the tile overlaps the edge.

If $\underline{\alpha}>0$ and $\overline{\alpha}>0$, the expression above can be simplified as:

$$\hat{t} = -\frac{1}{2}\frac{[\underline{\beta}, \overline{\beta}]}{[\underline{\alpha}, \overline{\alpha}]} = -0.5[\underline{\beta}, \overline{\beta}] \cdot [1/\overline{\alpha}, 1/\underline{\alpha}] \qquad (9)$$

$$= -0.5[\min(\overline{\beta}/\overline{\alpha}, \overline{\beta}/\underline{\alpha},), \max(\underline{\beta}/\overline{\alpha}, \underline{\beta}/\underline{\alpha},)]$$

where the last step comes from the interval multiplication optimizations due to the fact that $\hat{\alpha}>0$. Next we test whether $\hat{t}<t_s$ or $\hat{t}>t_e$ and if that is the case, there is no overlap, because the minimum occurs outside our time range of interest. Using equation 9 and some algebraic manipulation, the last test can be simplified to:

$$\hat{t}<t_s \Leftrightarrow \overline{\beta}>-2t_s\underline{\alpha}$$

$$\underline{\hat{t}}<t_e \Leftrightarrow \underline{\beta}>-2t_e\overline{\alpha}$$

Finally we need to test whether the local minimum is guaranteed to occur at t<0 or t>1.

Figure 12:
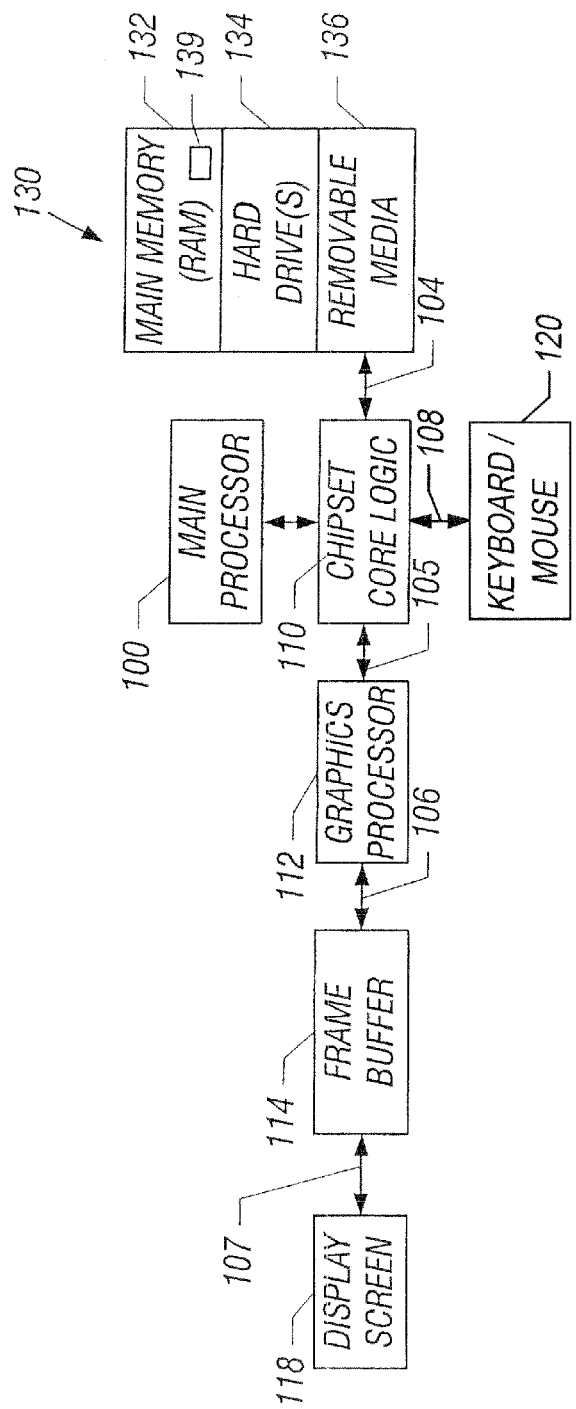
FIG. 12 is a schematic depiction for one embodiment.

The computer system 130, shown in FIG. 12, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 or any available memory within the graphics processor. Thus, in one embodiment, the code to perform the sequences of FIG. 11 may be stored in a non-transitory machine or computer readable medium, such as the memory 132 or the graphics processor 112, and may be executed by the processor 100 or the graphics processor 112 in one embodiment.

FIG. 11 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 11.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

What is claimed is:

1. A method of motion blur rasterization comprising:
traversing, using a graphics processor, a screen space region covered by a moving triangle, tile by tile;
testing samples within the tile against the moving triangle; and
executing a second test for triangle edges against tile corners, the second test being a tile corner versus moving edge overlap test, where the corners of the screen space tile are tested against the moving triangle edge.

2. The method of claim 1 including executing a first test for each plane of a tile frustum, the first test being a frustum plane versus moving bounding box overlap test where planes bounding a moving primitive are overlap tested against a screen tile frustum.

3. The method of claim 1 including using a bounded representation of the moving triangle edge equations.

4. The method of claim 2 including executing a second test for triangle edges against tile corners, the second test being a tile corner versus moving edge overlap test, where the corners of the screen space tile are tested against the moving triangle edge, and using said first and second tests to reduce the number of samples that need to be inside-tested against the moving triangle.

5. The method of claim 4 including defining a spatio-temporal sampling space where samples need not be inside-tested.

6. The method of claim 4 including defining a spatio-temporal sampling space where samples must be inside-tested.

7. The method of claim 2 including testing a moving axis aligned bounding box against a set of tile frustum planes, testing a moving object oriented bounding box against a set of tile frustum planes and using a linearly moving bounding box.

8. The method of claim 3 including using a linear approximation of the moving triangle edge equations.

9. The method of claim 4 including using a bounded representation of the moving triangle edge equations, and using a linear approximation of the moving triangle edge equations.

10. A non-transitory computer readable medium storing instructions to enable a processor to:
traverse a screen space region covered by a moving triangle, tile by tile;
test samples within the tile against the moving triangle; and
execute a second test for triangle edges against tile corners, the second test being a tile corner versus moving edge overlap test, where the corners of the screen space tile are tested against the moving triangle edge.

11. The medium of claim 10 further storing instructions to execute a first test for each plane of a tile frustum, the first test being a frustum plane versus moving bounding box overlap test where planes bounding a moving primitive are overlap tested against a screen tile frustum.

12. The medium of claim 10 further storing instructions to use a bounded representation of the moving triangle edge equations.

13. The medium of claim 11 further storing instructions to execute a second test for triangle edges against tile corners, the second test being a tile corner versus moving edge overlap test, where the corners of the screen space tile are tested against the moving triangle edge, and use said first and second test to reduce the number of samples that need to be inside-tested against the moving triangle.

14. The medium of claim 13 further storing instructions to define a spatio-temporal sampling space where samples need not be inside-tested.

15. The medium of claim 13 further storing instructions to define a spatio-temporal sampling space where samples must be inside-tested.

16. The medium of claim 11 further storing instructions to test a moving axis aligned bounding box against a set of tile frustum planes, test the moving object to create a bounding box against a set of frustum planes, and use a linearly moving bounding box.

17. The medium of claim 12 further storing instructions to use a linear approximation of the moving triangle edge equations.

18. The medium of claim 13 further storing instructions to use a bounded representation of the moving triangle edge equations, and to use a linear approximation of the moving triangle edge equations.

19. An apparatus comprising:
a processor to traverse a screen space region covered by a moving triangle, tile by tile, for each tile, test samples within the tile and the moving triangle, and execute a second test for triangle edges against tile corners, the second test being a tile corner versus moving edge overlap test, where the corners of the screen space tile are tested against the moving triangle edge; and
a storage coupled to said processor.

20. The apparatus of claim 19, said processor to execute a first test for each plane of a tile frustum, the first test being a frustum plane versus moving bounding box overlap test where planes bounding a moving primitive are overlap tested against a screen tile frustum.

21. The apparatus of claim 19, said processor to use a bounded representation of the moving triangle edge equations.

22. The apparatus of claim 20, said processor to execute a second test for triangle edges against tile corners, the second test being a tile corner versus moving edge overlap test, where the corners of the screen space tile are tested against the moving triangle edge, and use said first and second tests to reduce the number of samples that need to be inside-tested against the moving triangle.

23. The apparatus of claim 22, said processor to define a spatio-temporal sampling space where samples need not be inside-tested.

24. The apparatus of claim 22, said processor to define a spatio-temporal sampling space where samples must be inside-tested.

25. The apparatus of claim 20, said processor to test a moving axis aligned bounding box against a set of tile frustum planes, test the moving object to create a bounding box against a set of frustum planes, and use the linearly moving bounding box.

26. The apparatus of claim 21, said processor to use a linear approximation of the moving triangle edge equations.

27. The apparatus of claim 22, said processor to use a bounded representation of the moving triangle edge equations, and use a linear approximation of the moving triangle edge equations.

* * * * *